Aug. 27, 1935.  F. G. BEETEM  2,012,903
CHARGE CONTROLLING MEANS FOR STORAGE BATTERIES
Filed Oct. 29, 1934   2 Sheets—Sheet 1

WITNESS:

INVENTOR
Frank G. Beetem
BY
Augustus B. Stoughton
ATTORNEY.

Patented Aug. 27, 1935

2,012,903

UNITED STATES PATENT OFFICE 2,012,903

CHARGE CONTROLLING MEANS FOR STORAGE BATTERIES

Frank G. Beetem, Philadelphia, Pa., assignor to The Electric Storage Battery Company, Philadelphia, Pa., a corporation of New Jersey Application October 29, 1934, Serial No. 750,468

4 Claims. (Cl. 171—313)

The object of this invention is to provide a system including a storage battery and its load circuit and a charging generator with means for controlling the output of the generator selectively at either of two predetermined values and means for reducing the output from the higher to the lower value responsive to the voltage of the battery and for restoring the adjustment to correspond with the higher value whenever the generator is disconnected from the battery.

Other objects of the invention will appear from the following description at the end of which the invention will be claimed.

Figure 1:
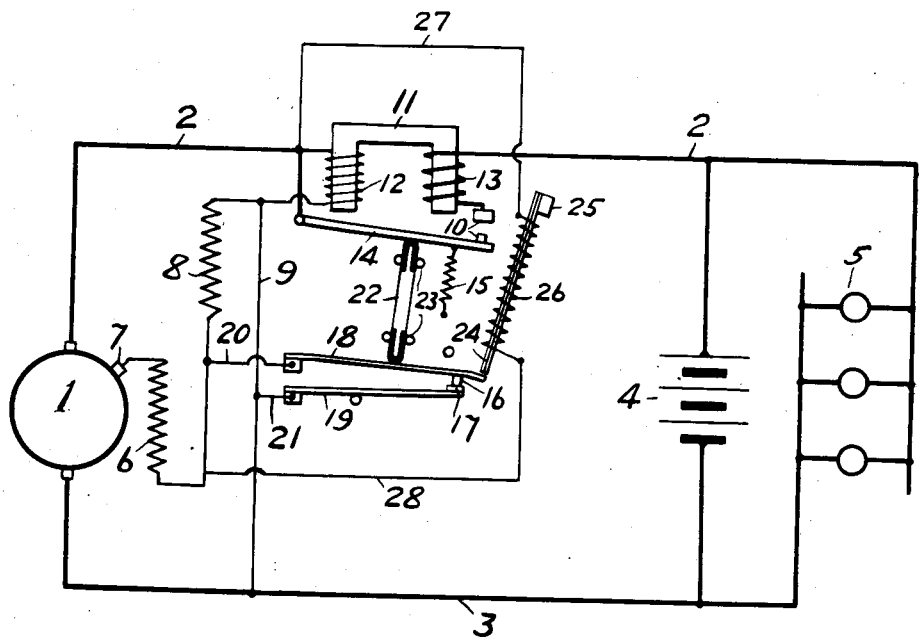

In the following description reference will be made to the accompanying drawings forming part hereof, and in which, Figure 1 is a diagrammatic illustration of a system embodying the invention in which the switching devices are shown in position to provide maximum generator output.

Figure 2:
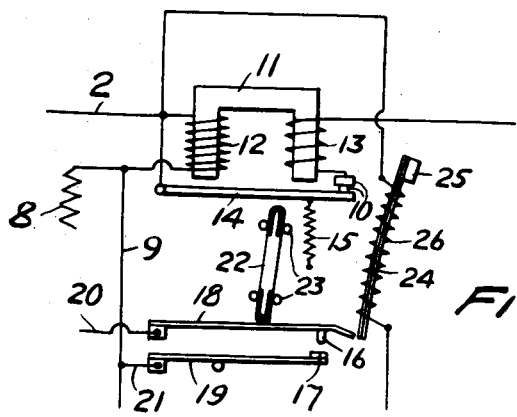
Figure 3:
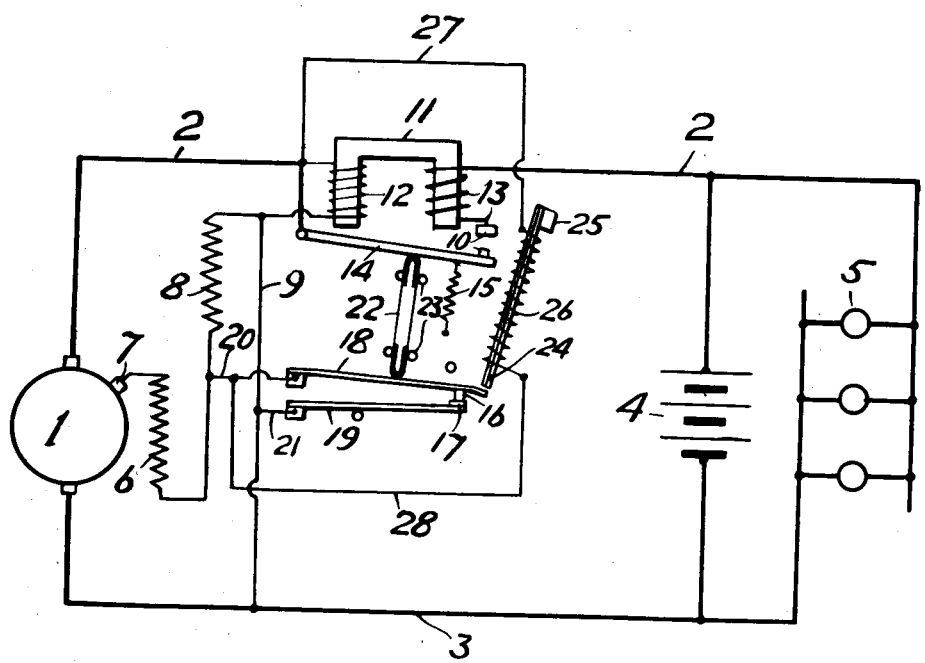

Figure 2 shows the position of these switches to provide minimum generator output, and Figure 3 is a like view illustrating a modification.

In Figure 1 the numeral 1 indicates a generator of the third brush type connected to the circuit 2, 3, to which is also connected a storage battery 4 and the load circuit 5. The field of the generator is shown at 6 connected at one end to the third brush 7 of the generator and at the other end through a resistor 8 via conductor 9 to conductor 3.

In series with conductor 2 are interposed the contacts 16 of the automatic switch 11 which is of the well known design, having a shunt coil 12 connected across the circuit 2, 3, and a series coil 13. The armature 14 of the automatic switch is stressed to the open position by the spring 15.

In Figure 1 the resistor 8 is shown short circuited by the contacts 16 and 17 mounted respectively on the resilient members 18 and 19, of which member 18 is connected to one terminal of the resistor 8 by conductor 20 and member 19 is connected to the other terminal of resistor 8 by conductors 21 and 9. In Figure 1 the contact between contacts 16 and 17 is brought about by the pressure exerted on the resilient member 18 by the pin 22 which as here shown is of insulating material loosely fitting into the guides 23 and bearing at its upper end against the under side of armature 14 of the automatic switch 11. The weight of the armature and the tension of the spring 15 are sufficient to cause the pin 22 to deflect the resilient member 18 downwardly until contact points 16 and 17 come into contact.

This contact is maintained, even after the armature 14 is lifted to close the automatic switch 11, by means of the thermal responsive bimetallic strip 24 mounted at one end on the fixed support 25 but free to move at its lower end into and out of engagement with the projecting end of the resilient member 18. The bimetallic strip 24 is surrounded by a heating coil 26 connected by conductors 27 and 28 across the circuit 2, 3. The heat produced by the coil 26 causes the lower end of the bimetallic strip to move to the right and at a certain voltage across the circuit 2, 3, this movement will be sufficient to release the resilient member 18, and if at this time the automatic switch is closed, thus relieving the pressure on the pin 22, the position of the various parts will be as shown in Figure 2 in which the lower end of the bimetallic strip 24 is moved to the right, releasing the end of resilient member 18 and permitting this to assume its free horizontal position with the contact open between 16 and 17.

The operation of the apparatus above described will be as follows:

When the generator 1 is shut down, developing no voltage, the automatic switch will be open and there will be no heat developed in coil 26 so that the apparatus will be in the position shown in Figure 1. When the generator is started up and develops sufficient voltage, the automatic switch 11 will close, thus connecting the generator to the battery and delivering charging current to the latter. The pressure on the pin 22 due to the armature 14 will be relieved but during the early stages of the charge the voltage across the circuit 2, 3 will not be sufficient to develop enough heat in the coil 26 to deflect the bimetallic strip 24 far enough to release the end of the resilient member 18 and the contact between 16 and 17 will remain closed, thus maintaining the short circuit around the resistor 8 and adjusting the field excitation for maximum generator output. As the charging of the battery progresses, its voltage will increase until a point is reached where the heat developed in coil 26 will cause the bimetallic strip 24 to deflect far enough to release the resilient member 18, opening the contact between 16 and 17 as illustrated in Figure 2, thus opening the short circuit around resistor 8 and reducing the output of the generator to the lower value suitable for completing the charge of the battery at a lower rate.

If now the generator is shut down, the automatic switch will open and the armature 14 will apply pressure to the pin 22, closing the contact between 16 and 17, thus adjusting the generator field circuit to provide maximum generator output when the generator starts up again. At the same time the heat developed in coil 26 will be reduced and the bimetallic strip 24 will straighten out, assuming again the position shown in Figure 1, so that when the automatic switch again closes upon starting up of the generator, the field excitation will remain adjusted for the maximum generator output until the voltage again rises to the point where the bimetallic strip 24 will deflect and permit the contact between 16 and 17 to open.

The member 19 is made resilient as well as the member 18 in order to provide a slight clearance between the lower end of the bimetallic strip 24 and the free end of the resilient member 18 when the parts are in the position shown in Figure 1. When the armature 14 is lifted, relieving the pressure of the pin 22 on the member 18, the latter will rise slightly at its outer end until it comes in contact with the bimetallic strip 24 and the outer end of the resilient member 19 will follow this slight motion and prevent opening the contact between 16 and 17 until the bimetallic strip 24 has been sufficiently deflected.

In Figure 3 a modification is shown in which conductor 28 is connected to conductor 20 instead of to conductor 9. When the contact between 16 and 17 is closed, the connection from the lower end of coil 26 to conductor 3 will be made via conductors 28 and 20, member 18, contacts 16 and 17, member 19 and conductor 9. When the contact between 16 and 17 is opened, coil 26 will no longer be connected directly across the circuit 2, 3 but the lower end of coil 26 will be connected to conductor 3 via resistor 8 and conductor 9. This will appreciably reduce the current in coil 26 and more quickly bring the bimetallic strip 24 back to its low temperature straight line condition. This may occur before the armature 14 of the automatic switch has dropped and depressed member 18, in which case the lower end of bimetallic strip 24 will rest against the outer end of member 18 until the latter is depressed by the dropping of armature 14.

It will be obvious to those skilled in the art to which the present invention relates that modifications may be made in details of construction and arrangement and in matters of mere form without departing from the spirit of the invention which is not limited to such matters or otherwise than the prior are and the appended claims may require.

I claim:

1. In combination a storage battery, a charging generator, circuit connections between them including the contacts of an automatic switch, a field coil for the generator, a resistor in series with the field coil, a conducting circuit connected in parallel with said resistor and including a pair of normally open contacts, means responsive to the opening of the automatic switch contacts for closing the normally open contacts but inoperative to hold said normally open contacts closed when the automatic switch contacts are closed, and a voltage responsive thermostatic device adapted to lock the normally open contacts in the closed position when the generator voltage is below a predetermined value and to release said normally open contacts to the open position when the generator voltage is above a predetermined value.

2. In a distribution system of the type recited the combination of a pair of interlocking switches of which one is a short circuiting switch and is closed when the other which is an automatic switch is opened, a thermostatic hold-over latch device adapted at normal temperature to hold the short circuiting switch closed and adapted when heated to release it, a voltage circuit for the thermostatic device, and a generator field resistor adapted to be short circuited by the last mentioned switch.

3. In a distribution system of the type described, the combination of a storage battery, a source of charging current therefor, means for adjusting the output of the source selectively at either of two predetermined values, a pair of interlocking switches whereof one is an automatic switch adapted to connect the source to the battery and the other is provided with circuit connections for adjusting the output of the source to the higher or lower value upon closing or opening its contacts respectively and adapted to be closed by the opening of the automatic switch, a thermostatic latch device adapted at normal temperature to hold the adjusting switch closed and adapted when heated to release it, and a voltage responsive heating coil for the thermostatic latch device.

4. In a distribution system of the type described, the combination of a storage battery, a source of charging current therefor including a generator having a field coil and a resistor in series therewith, a pair of interlocking switches whereof one is an automatic switch adapted to connect the source to the battery and the other is provided with contacts and circuit connections for short circuiting the resistor and adapted to be closed by the opening of the automatic switch, a thermostatic latch device adapted at normal temperature to hold the short circuiting switch closed and adapted when heated to release it, and a voltage responsive heating coil for the thermostatic latch device connected between one terminal of the generator and a point in the circuit between the field coil and the resistor.

FRANK G. BEETEM.